(12) United States Patent
Robertson et al.

(10) Patent No.: US 9,073,268 B2
(45) Date of Patent: Jul. 7, 2015

(54) PLUGS FOR REPAIRING SIFTING OR FILTERING SCREENS

(75) Inventors: Graham Robertson, Edinburgh Fife (GB); Claire Galloway, Lothian (GB); Andrew Ralph, Lothian (GB)

(73) Assignee: United Wire Limited (GB)

( * ) Notice: Subject to any disclaimer, the term of this patent is extended or adjusted under 35 U.S.C. 154(b) by 1197 days.

(21) Appl. No.: 12/668,453

(22) PCT Filed: Jul. 1, 2008

(86) PCT No.: PCT/GB2008/050527
§ 371 (c)(1),
(2), (4) Date: Mar. 29, 2010

(87) PCT Pub. No.: WO2009/013521
PCT Pub. Date: Jan. 29, 2009

(65) Prior Publication Data
US 2010/0187773 A1    Jul. 29, 2010

(30) Foreign Application Priority Data
Jul. 25, 2007    (GB) .................................. 0714510.5

(51) Int. Cl.
*B07B 1/46*    (2006.01)
*B29C 73/06*    (2006.01)
*B29C 45/16*    (2006.01)

(52) U.S. Cl.
CPC ............... *B29C 73/06* (2013.01); *B07B 1/4627* (2013.01); *B29C 45/1676* (2013.01)

(58) Field of Classification Search
CPC .. B01D 29/96; B01D 2201/34; B07B 1/4627; B07B 1/4645

USPC ................... 210/232; 209/399, 401, 403, 659
See application file for complete search history.

(56) References Cited

U.S. PATENT DOCUMENTS

| 5,490,598 A | | 2/1996 | Adams | |
|---|---|---|---|---|
| 5,928,448 A | | 7/1999 | Daws | |
| 5,988,397 A | * | 11/1999 | Adams et al. | 209/401 |
| 6,029,824 A | * | 2/2000 | Adams | 209/401 |

(Continued)

FOREIGN PATENT DOCUMENTS

| DE | 16 80 519 | 2/1970 |
|---|---|---|
| EP | 1 293 265 A2 | 3/2003 |

OTHER PUBLICATIONS

International Search Report for PCT/GB2008/050527, mailed Jan. 14, 2009.

(Continued)

*Primary Examiner* — Kristina Fulton
*Assistant Examiner* — Nicholas L Foster
(74) *Attorney, Agent, or Firm* — Patents+TMS, P.C.

(57) ABSTRACT

There is provided a plug for repairing a sifting or filtering screen, the plug comprising a body (1) of a first material supporting an area of a second material which is more resilient than the first material, in use the area of a second material serving as a seal (2) to engage and seal against the screen in order to plug a cell aligned with a damaged area of the screen. A second plug has a body (101) formed with holes (108) to receive securing members such as screws, the holes being positioned to enable the securing members (109) to pass into the material of the sifting or filtering screen in order releasably to secure the plug in a cell aligned with a damaged area of the sifting screen.

6 Claims, 8 Drawing Sheets

(56) References Cited

U.S. PATENT DOCUMENTS

| | | | |
|---|---|---|---|
| 6,152,307 A | 11/2000 | Adams et al. | |
| 6,872,466 B2* | 3/2005 | Robertson et al. | 428/608 |
| 6,956,168 B2* | 10/2005 | Herth | 174/53 |
| 6,983,849 B1* | 1/2006 | Toler et al. | 209/659 |
| 7,665,272 B2* | 2/2010 | Reen | 52/742.14 |
| 2015/0001136 A1* | 1/2015 | Galloway McLean | 209/391 |

OTHER PUBLICATIONS

Written Opinion of the International Searching Authority for PCT/GB2008/050527, mailed Jan. 14, 2009.

Johannaber et al., "Handbuch Spritzgiessen, PASSAGE", *Hanbuch Spritzgiessen*, Jan. 1, 2002, pp. 506-509, XP002299967.

Caamano, "Hard Rules for Soft-touch Overmolding", *Machine Design*, May 9, 2002, pp. 60, 62-65, XP001198805.

\* cited by examiner

PLUGS FOR REPAIRING SIFTING OR FILTERING SCREENS

This application is the U.S. national phase of International Application No. PCT/GB2008/050527 filed 1 Jul. 2008 which designated the U.S. and claims priority to GB Application No. 0714510.5 filed 25 Jul. 2007, the entire contents of each of which are hereby incorporated by reference.

FIELD OF THE INVENTION

This invention relates to plugs for repairing sifting or filtering screens, particularly screens used in the oil drilling industry for separating solids from the liquid phase of oil and water-based muds retrieved from drilling operations.

BACKGROUND TO THE INVENTION

U.S. Pat. No. 6,872,466 discloses a method of repairing a damaged sifting or filtering screen having an outer frame across which the filtering mesh is stretched. Within the frame a rectangular grid of ribs divides the filtering area into an orthogonal array of cells. Damage to the mesh is repaired by snap-fitting a plastics plug into the cell underlying the damaged area of the mesh. This repairs the screen by plugging the cell and preventing any particles passing through that cell. However, such known plugs suffer from the disadvantages that they do not always seal adequately against the material of the screen and they do not always snap properly into the desired location and can sometimes fall out of the cell into which they have been placed, in each case this allowing some particles to pass through the damaged cell.

SUMMARY OF THE INVENTION

According to one aspect of the invention, there is provided a plug for repairing a sifting or filtering screen, the plug comprising a body of a first material supporting an area of a second material which is more resilient than the first material, in use the area of second material serving as a seal to engage and seal against the screen in order to plug a cell aligned with a damaged area of the screen. The body of the plug imparts the necessary strength and durability to the plug and the more resilient and compressible seal acts to prevent the passage of particles through the plug/screen interface.

The plug is preferably formed by co-moulding the body and the seal.

According to another aspect of the invention, there is provided a plug for repairing a sifting or filtering screen, the plug having a body formed with holes to receive securing members such as screws, the holes being positioned to enable the securing members to pass into the material of the sifting or filtering screen in order releasably to secure the plug in a cell aligned with a damaged area of the sifting or filtering screen. By the use of securing members, such as self-tapping screws, the plug can be firmly and reliably attached to the appropriate cell but can be readily removed (by releasing the screws) in order to replace the plug or re-use the plug in another location.

BRIEF DESCRIPTION OF THE DRAWINGS

Two plugs forming preferred embodiments of the invention will now be described, by way of example, with reference to the accompanying drawings, in which.

DETAILED DESCRIPTION OF THE DRAWINGS

Figure 1:
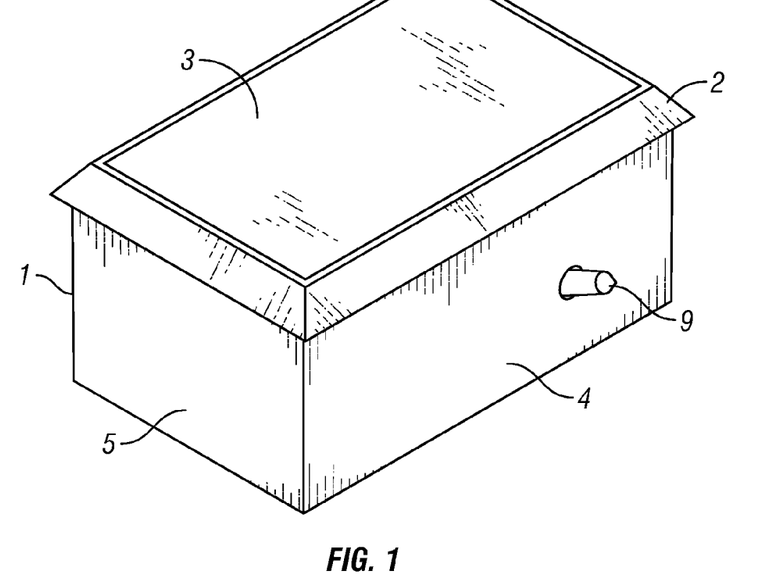
FIGS. 1 and 2 are isometric views of the first plug.
Figure 2:
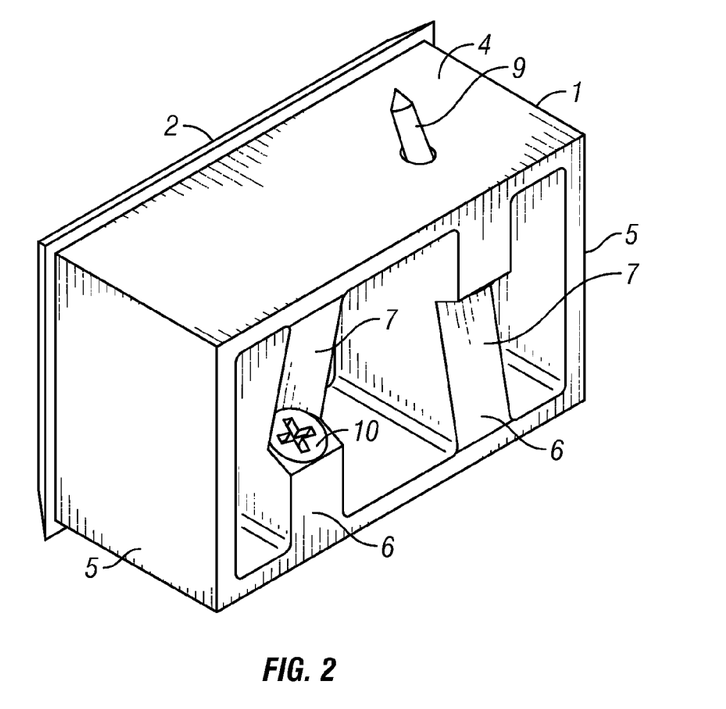
Figure 3:
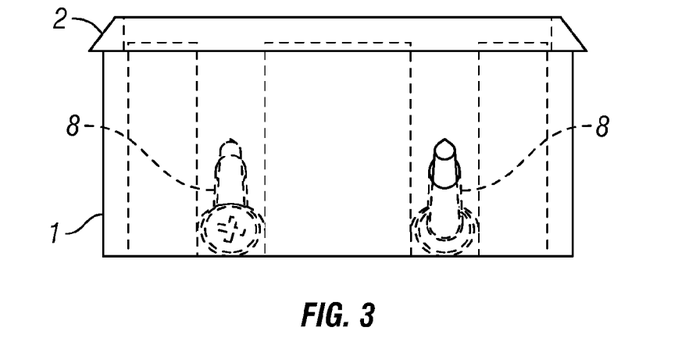
FIG. 3 is a side view of the first plug.
Figure 4:
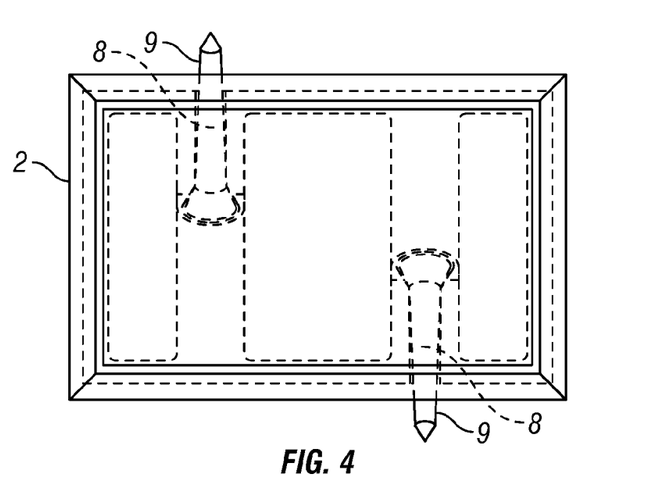
FIG. 4 is a plan view of the first plug.
Figure 5:
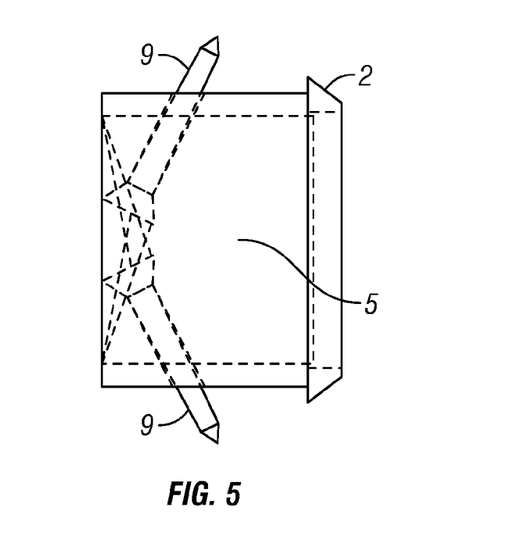
FIG. 5 is an end view of the first plug.
Figure 6:
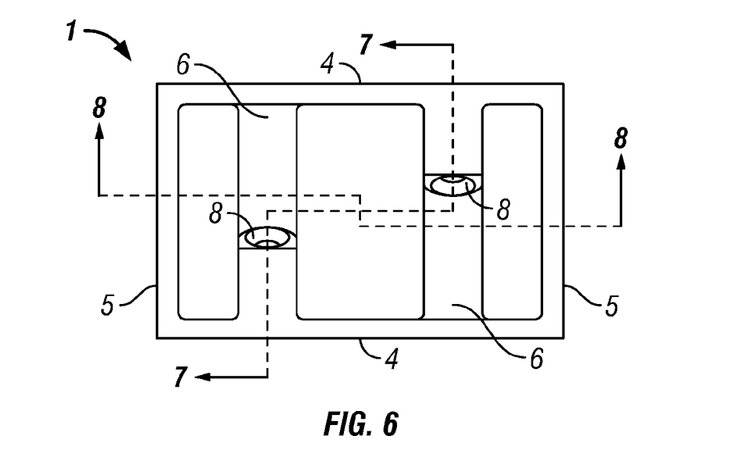
FIG. 6 is an underside view of a body of the first plug.
Figure 7:
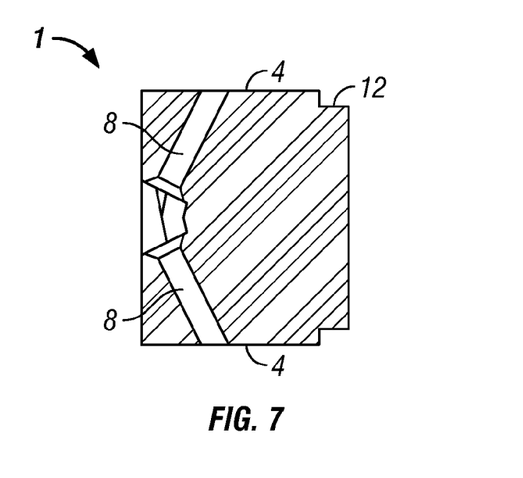
FIGS. 7 and 8 are respectively sectional views on the lines VII-VII and VIII-VIII of FIG. 6.
Figure 8:
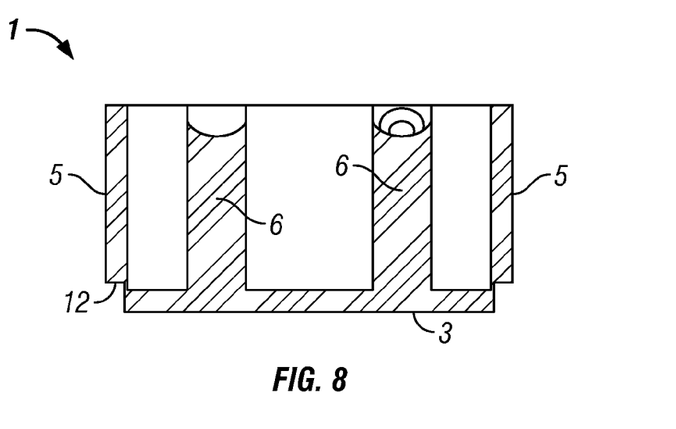

The first plug has a body 1 injection moulded from rigid polypropylene around the upper peripheral edge of which is a co-moulded compressible seal 2 made from a polypropylene-based thermal plastic elastomer. The body 1 (FIGS. 6 to 8) has the shape of a generally rectangular block with an upper wall 3, a pair of longer side walls 4, a pair of shorter side walls 5 and two intermediate walls 6 (to reinforce the plug) which are parallel to the shorter end walls 5 and project downwardly from the upper wall 3 towards the open base of the body 1.

The lower edge of each intermediate wall 6 is moulded with a notch-shaped recess 7, an angled edge of which forms the entry of a circular hole 8 which extends through the corresponding intermediate wall 6 and emerges in a hole in the adjacent side wall 4. Each hole 8 makes an angle of 27 degrees with the horizontal and 63 degrees to the vertical plane of the corresponding longer wall. Self-tapping screws 9 are inserted into the holes 8 from the underside of the plug, as illustrated in FIGS. 1 to 4, for the purpose of removably securing the plug in a cell of a filtering screen. The head 10 of one screw 9 is visible in FIG. 2. The upper periphery of the body 1 is moulded with a step defining a right-angled ledge 12 (FIGS. 7 and 8) which extends around all four sides of the upper edges of the body 1.

Figure 9:
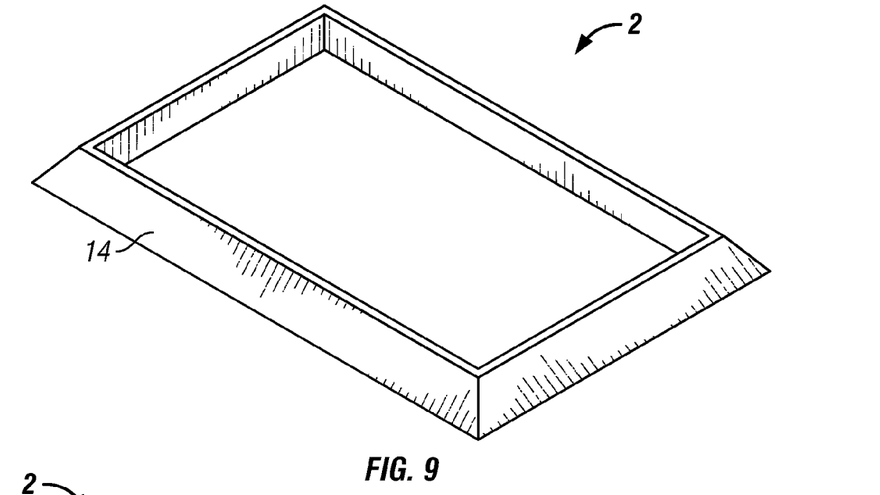
FIG. 9 is an isometric view of a peripheral seal of the first plug.
Figure 10:
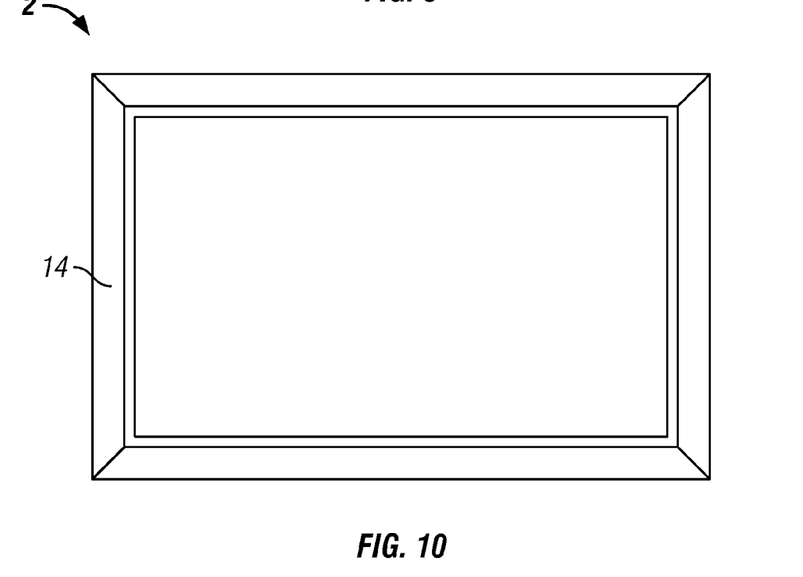
FIGS. 10 and 11 are plan and side views of the seal of FIG. 9.
Figure 11:
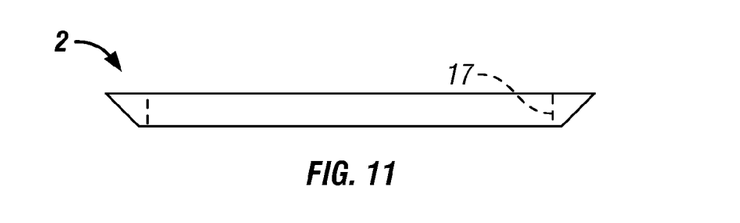
Figure 12:
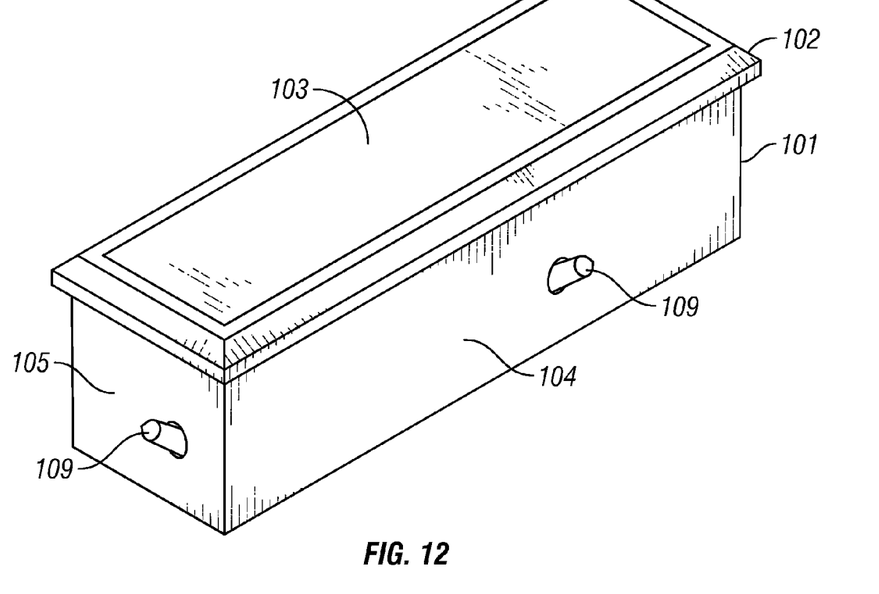
FIGS. 12 and 13 are isometric views of the second plug.
Figure 13:
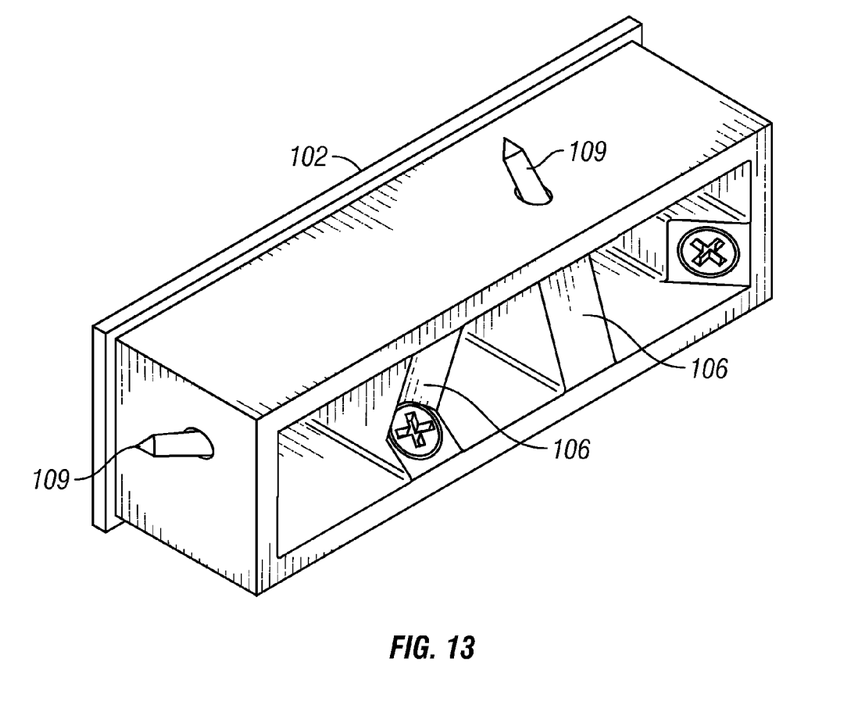

The seal 2 (shown separately from the plug body in FIGS. 9 to 11) is moulded in the shape of a rectangular frame, having an inner periphery with a right-angled sectional shape 17 which fits precisely in the right-angled ledge 12 moulded in the upper edge of body 1. The upper and outer edge of the seal 2 has a sloping edge 14.

In the drawings the body 1 and seal 2 are shown separately and they may be separately moulded and then attached together to form the complete plug, but the preferred method of manufacture is to co-mould the seal and body in a single moulding operation which not only moulds the body and seal to their required respective shapes but also bonds the seal firmly to the body to provide the complete plug.

The plug body 1 has a length of 55 mm, a width of 34.5 mm and a height of 28 mm. The seal 2 has a length of 58 mm and a width of 38 mm. Thus, the seal projects beyond the body around the complete upper periphery of the plug, this projecting edge engaging and being resiliently deformed by the cell edge, to provide an effective seal at the cell/plug interface around the complete periphery of the plug.

To repair an area of damaged mesh in a screen, the plug is inserted in the cell underlying the damaged area of mesh, in a manner similar to that described in U.S. Pat. No. 6,872,466. However, in the case of the plug of FIGS. 1 to 11 the compressible elastomeric seal 2 engages and seals against co-operating surfaces of the screen so as to provide an effective seal between the screen and the plug so as to prevent the passage of any particles through the cell which is thereby blanked off by the plug. Further, inserting the self-tapping screws 9 into the holes and then screwing them into the ribs provides a firm and secure attachment for the plug within the cell. The plug can be removed for replacement or re-use by simply releasing the screws.

The second plug shown in FIGS. 12 to 23 is similar to the plug of FIGS. 1 to 11 and corresponding parts bear the same reference numerals increased by 100. The plug body 101 has a length of 80.9 mm, a width of 24 mm and a height of 27 mm. The seal 102 (FIGS. 21 to 23) has a length of 84 mm, and a width of 27 mm, so the seal 102 again projects beyond the body 101 around all four top edges of the plug. The plug of FIGS. 12 to 23 is thus longer and narrower than the plug of FIGS. 1 to 11, to suit a longer and narrower cell size.

Figure 14:
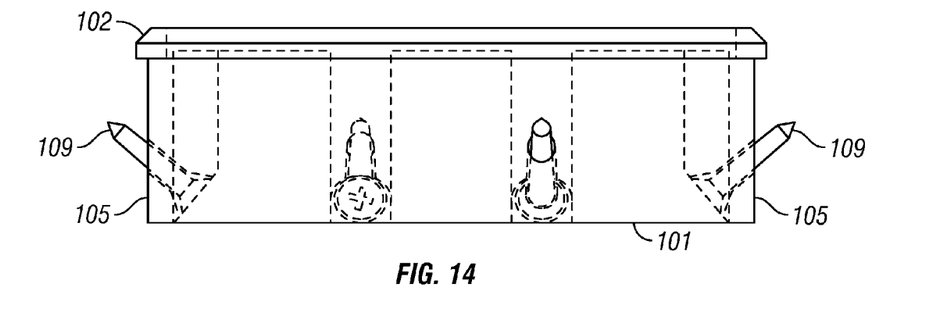
FIG. 14 is a side view of the second plug.
Figure 15:
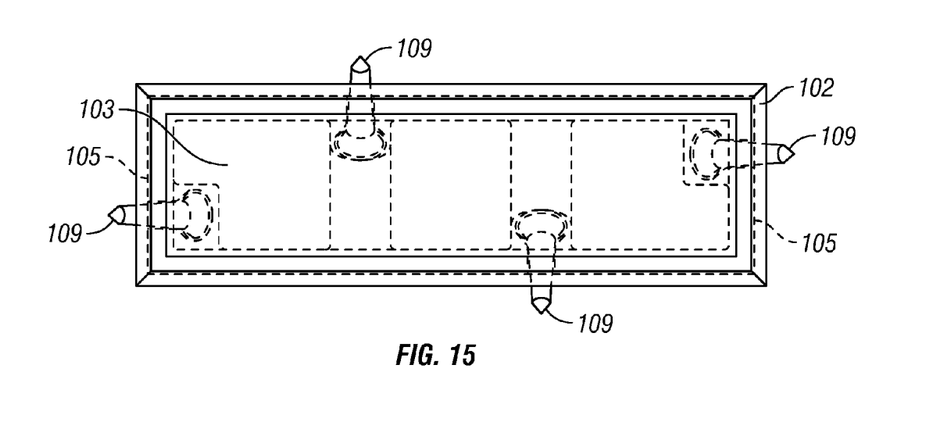
FIG. 15 is a plan view of the second plug.
Figure 16:
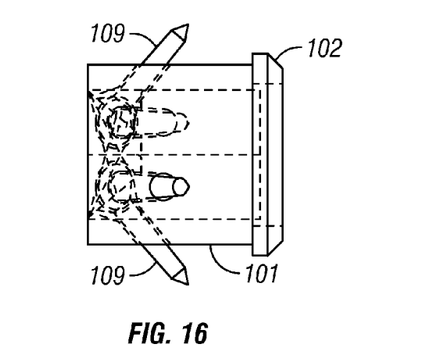
FIG. 16 is an end view of the second plug.
Figure 17:
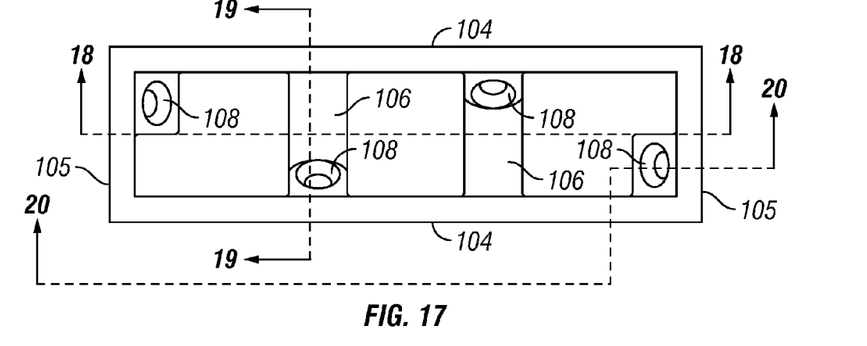
FIG. 17 is an underside view of a body of the second plug.
Figure 18:
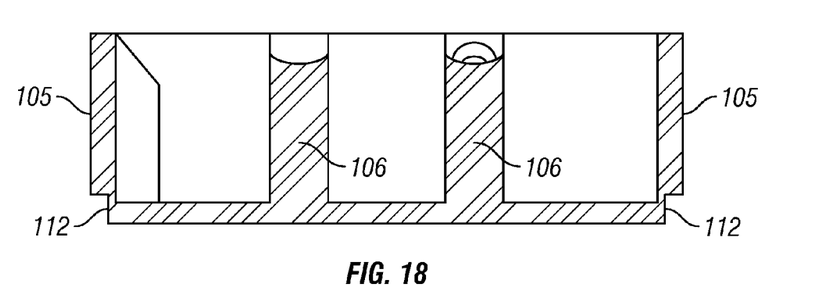
FIGS. 18, 19 and 20 are sectional views on the lines XVIII-XVIII, IXX-IXX and XX-XX of FIG. 7.
Figure 19:
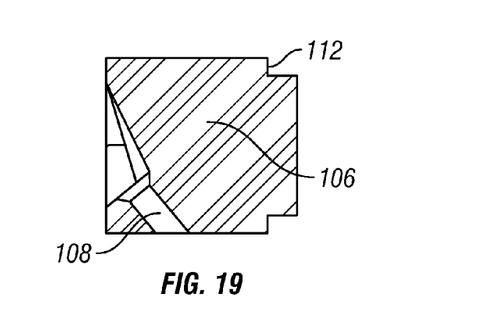
Figure 20:
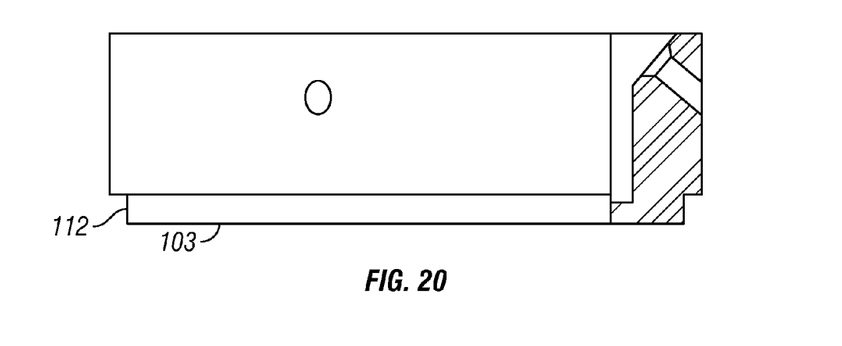

It can be seen from the drawings that the second plug has a pair of longer walls 104 and a pair of shorter walls 105 surrounding two intermediate walls 106 and that these intermediate walls have holes 108 which emerge through the longer side walls 104 in a manner comparable to the first plug. In the case of the second plug, two internal corners are thickened and angled holes 108 extend through these thickened portions and emerge through the shorter side walls 105. Thus, there are four holes 108 and a total of four self-tapping screws 109 are used, in this case each angled at 40 degrees to the horizontal, as shown in FIGS. 14 and 16.

Figure 21:
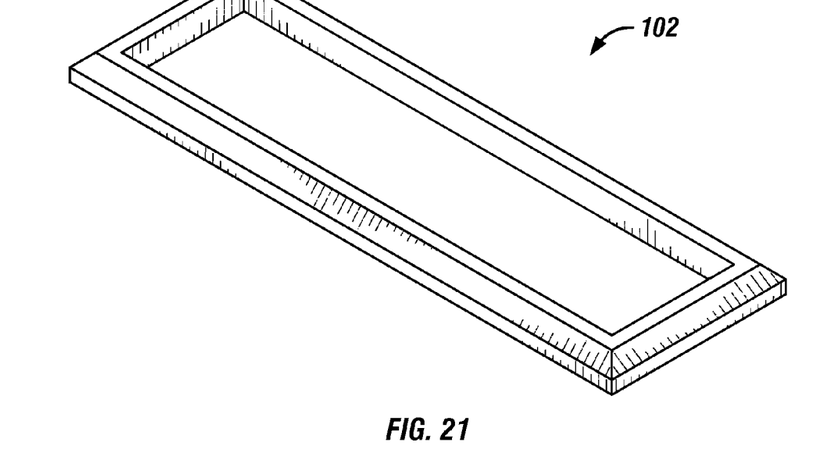
FIG. 21 is an isometric view of a peripheral seal of the second plug.
Figure 22:
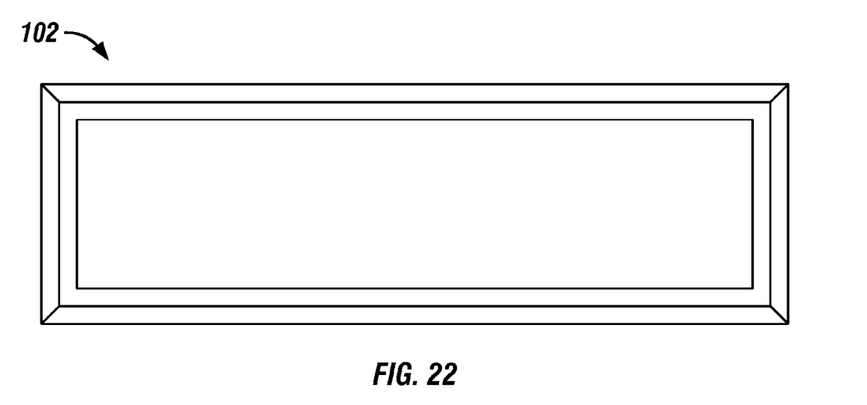
FIGS. 22 and 23 are plan and end views of the seal of FIG. 21.
Figure 23:
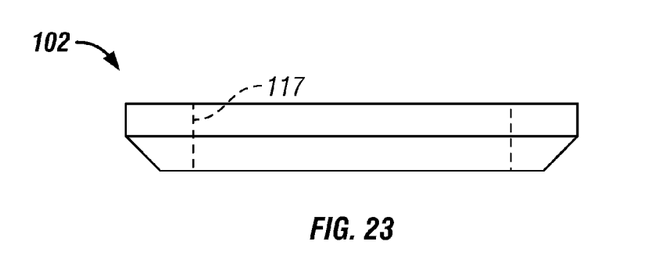

The seal 102 of the second plug is shown separately in FIGS. 21 to 23 and corresponds to the seal 2 of the first plug, except for its longer length and shorter width and less deep chamfered edge.

The plug of FIGS. 12 to 23 is used as described in relation to the plug of FIGS. 1 to 11, except that the plug of FIGS. 12 to 23 is used to plug a cell having a longer length and shorter width and is detachably secured by the four self-tapping screws 109. As before, the seal 102 engages the screen to prevent any particles passing through the plugged cell and the use of the self-tapping screws 109 not only gives a firm attachment but enables the plug to be removed and re-used.

The invention claimed is:

1. A plug for repairing a damaged screen from only one side of the damaged screen, the plug comprising:
   a block having two parallel side walls arranged perpendicular to two parallel end walls defining an interior of the block, the block having a rectangular circumference, a top, and a bottom;
   two interior walls extending between the two parallel side walls within the interior of the block; and
   a rectangular seal located at the top of the block and extending continuously around and projecting outwardly beyond the rectangular circumference of the block, wherein the seal is insertable into a cell aligned with a damaged area of the damaged screen to seal the cell;
   wherein the block is formed with holes therein to receive securing members, the holes are positioned to enable the securing members to pass into the screen to releasably secure the block in the cell aligned with the damaged area of the damaged screen, wherein the holes are angled through holes each running through one of the interior walls and one of the side walls; and
   wherein the block is formed of a first material and the seal is formed from a second, different material that is more resilient than the first material.

2. The plug according to claim 1, wherein the block and the seal are co-molded.

3. The plug according to claim 1, wherein the block is made from polypropylene and the seal is made from polypropylene-based thermal plastic elastomer.

4. The plug according to claim 1, wherein the holes allow for shanks of the securing members to pass into the material of the screen, and further wherein heads of the securing members are accessible from an underside of the block.

5. The plug according to claim 1, wherein the securing members are screws.

6. A method of repairing a damaged screen from only one side of the damaged screen, the method comprising:
   providing the plug of claim 1
   inserting the plug into a cell aligned with a damaged area of the damaged screen to seal the cell; and
   securing the plug into the cell by passing the securing members through the holes and into the material of the screen, and tightening the securing members.

* * * * *